Figure 3:
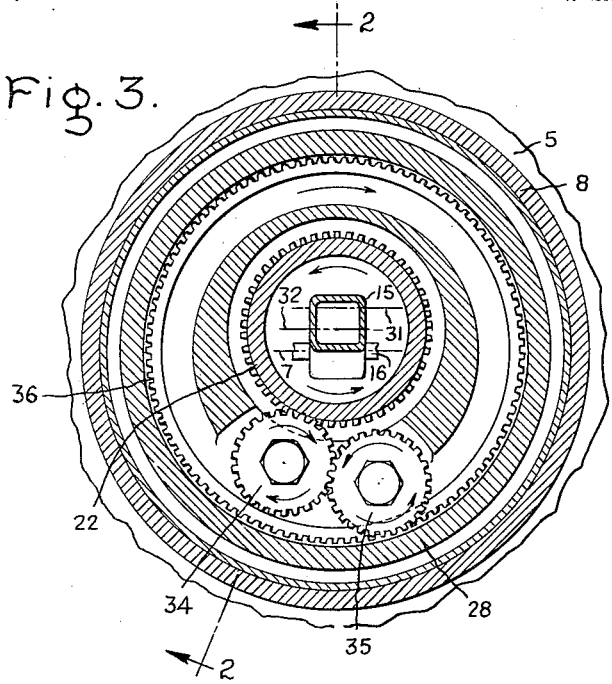

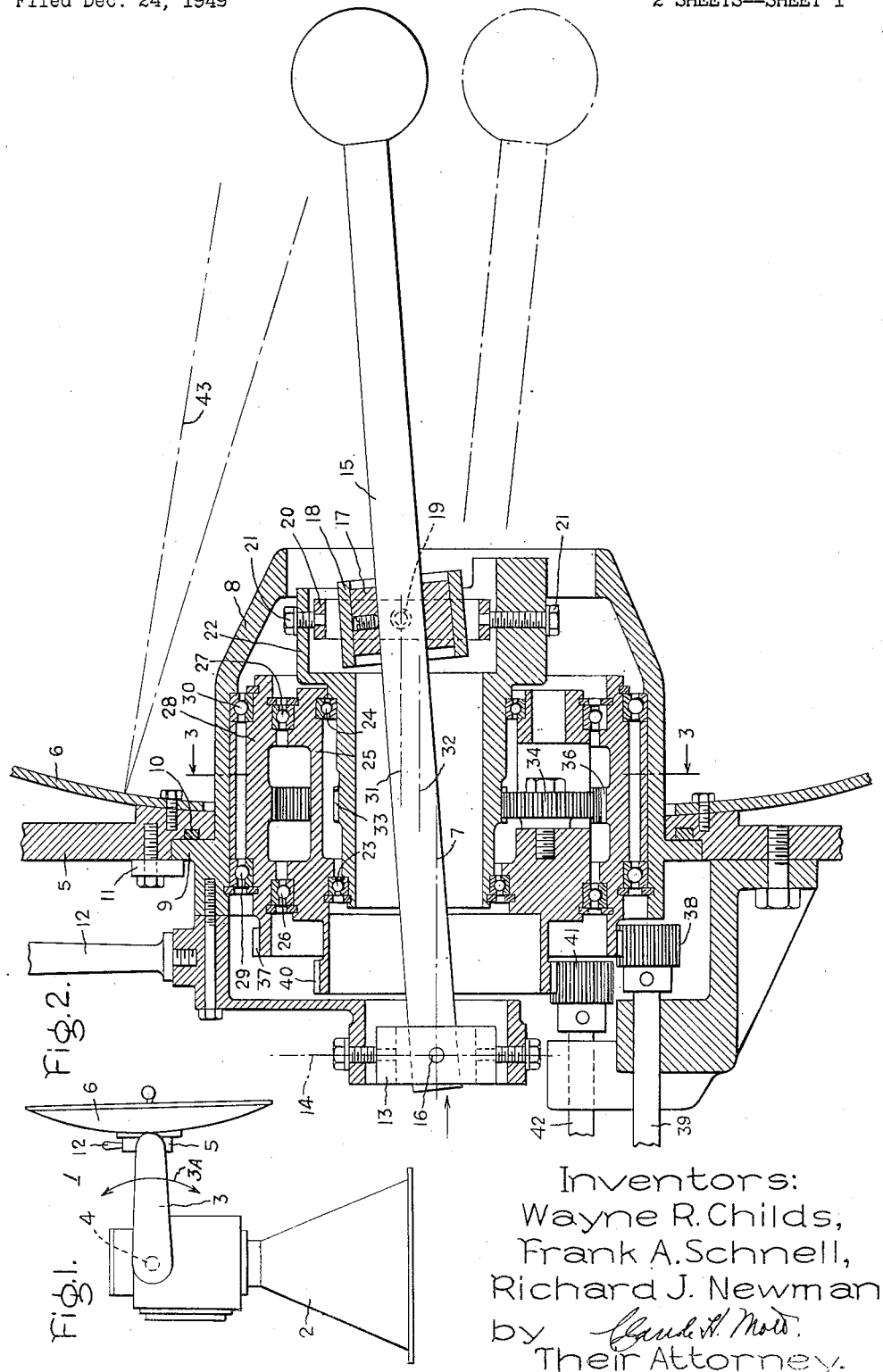

Nov. 6, 1951 W. R. CHILDS ET AL 2,574,376
ANTENNA SCANNER
Filed Dec. 24, 1949 2 SHEETS—SHEET 2

Inventors:
Wayne R. Childs,
Frank A. Schnell,
Richard J. Newman,
by *Claude A. Mott*
Their Attorney.

Patented Nov. 6, 1951

2,574,376

UNITED STATES PATENT OFFICE 2,574,376

ANTENNA SCANNER

Wayne R. Childs, Schenectady, and Frank A. Schnell, Endwell, N. Y., and Richard J. Newman, Newark, N. J., assignors to General Electric Company, a corporation of New York Application December 24, 1949, Serial No. 135,006

7 Claims. (Cl. 250—33.65)

Our invention relates to radio detection and ranging systems in which electromagnetic waves are radiated and upon echoing from objects at a distance, are received after time intervals depending upon the remoteness of such objects. More particularly, our invention relates to a new scanning mechanism for locating an object and for finding and securing a detailed image of such object.

Scanning for the location of a target is generally accomplished with an antenna by nutation of the axis of the projected beam about the axis of a reflector in a spiral or an ellipse. Spirals subtend an angle of about 3° so that in order to scan a volume above an area, it is necessary for the beam to describe vertical series of spirals for successive positions in azimuth. When an object is located during the progression of a spiral, a change in focus is effected to produce a more detailed image on the radar screen by switching control of the radiating member to tracking whereby the member is caused to nutate in a circle in a narrower field and to follow the object thereby producing a detailed picture on the radar screen. To shorten the scanning time and provide more thorough exploration, we have devised an apparatus and a method in which scanning is accomplished in a series of substantially vertical planes adjacent in azimuth for exploring the volume above an area.

According to our invention, the antenna of a radar system rotatable about a vertical axis, includes a reflector having a cut-out center section mounted upon a housing and a radiating member projecting through the reflector to radiate and receive electromagnetic waves. The radiating member includes a wave guide of rectangular cross-section for directing the path of electromagnetic waves nutating within the central portion of the reflector, which nutation is defined as the movement of the radiating member with respect to the axis of the reflector while an axis perpendicular to the reflector axis and called the nutation axis is maintained within an axial longitudinal plane of the member. Nutation of the radiating member about the reflector axis can be varied by suitable means incorporated in the device so that the directive or scanning axes of the reflector describe a spiral, circular, or linear path.

In carrying out our invention, a reflector is mounted upon a support pivoted upon the head of a radar antenna. The radiating member of the antenna is pivoted at one end in a first gimbal mounted in a casing which is rotatably mounted upon the support and projects through the hollow center of the reflector. The radiating member is actuated intermediately by a balanced nutative mechanism including a cylindrical member rotatable in the casing about the reflector axis, and two cylinders having eccentric cylindrical bores, the first of which is journaled within the cylindrical member. The second cylinder rotates within the eccentric bore of the first cylinder. The radiating member is intermediately slidably centered in a second gimbal which is centered in the second eccentric bore. Variations in radiation pattern are secured by varying the respective angular velocities of the cylinders in amount and direction, the transition therebetween being effected rapidly and without interruption to the operation of the system.

A primary object of our invention is to provide a new and improved antenna for radio detection and ranging systems.

Another object of our invention is to provide an antenna having a balanced nutational element for radio detection and ranging systems adjustable to provide scanning in a vertical plane.

A further object of our invention is to provide an improved antenna for radio detection and ranging systems which selectively provides circular, spiral, or planar scanning.

Another object of our invention is to provide a new and improved scanning antenna in which the mode of scanning may be changed rapidly and easily.

A still further object of our invention is to provide a tracking radar antenna that in shipboard installations can be used as a navigational device.

An additional object of our invention is to provide a simple adjustable device for securing various dynamically-balanced movements of a mechanical member including linear movement of the member.

Other objects of our invention will appear from the following description of the invention and the novel features characteristic of the invention are set forth with particularity in the appended claims.

The invention itself, however, as to its organization and method of operation may best be understood by reference to the following description coupled with the accompanying drawing.

Figure 4:
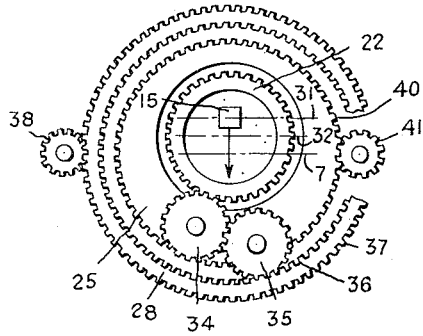
Figure 5:
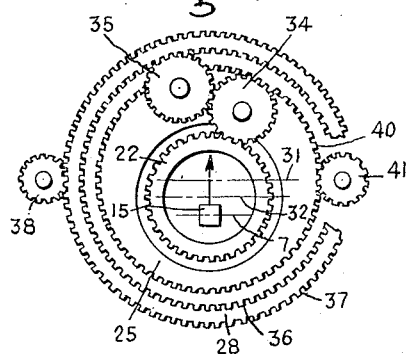
Figure 6:
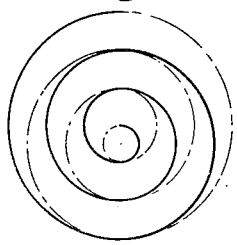

Fig. 1 is an elevation view of a radar antenna incorporating our invention; Fig. 2 is a fragmentary vertical sectional view along the line 2—2 of Fig. 3 looking in the direction of the arrows; Fig. 3 is a view of section 3—3 looking in the direction of the arrows; Figs. 4 and 5 are schematic views of the apparatus in two positions of a nodding scan; Fig. 6 is a trace of the scanning axis during a spiral scanning cycle.

Referring to the drawing, an antenna head 1 is rotatable about a vertical axis upon a base 2 by any suitable means. An arm 3 is pivoted at 4 to be movable in the direction of an arrow 3A. A support 5 mounted upon arm 3 supports reflector 6 having an axis 7. A rotatable casing 8 is provided with a flange 9 bearing against a friction washer 10 and held in position by clamps 11 bolted to housing 5 at intervals around the circumference of flange 9. A handle 12 is provided upon casing 8 which is rotatable about axis 7 through a 90° angle to either side of the vertical plane position of handle 12.

The ring 13 of a first gimbal centered on axis 7 is pivotally mounted upon supports within the bore of casing 8 for rotation about an axis 14. A radiating element 15 having a hollow rectangular cross-section is provided with trunnions 16 journaled in gimbal 13. A collar 17 fixedly mounted upon element 15 at an intermediate point is slidable in sleeve 18.

Sleeve 18 is pivotaly suspended between the trunnions 19 of a ring 20 of a second gimbal centrally mounted upon supports 21 in the cylindrical bore of a cylinder 22 eccentric with the rotational axis thereof. Cylinder 22 is rotatable in bearing 23 and 24 in the cylindrical bore of a cylinder 25 which is eccentric with the rotational axis thereof. Cylinder 25 is rotatably mounted in bearings 26 and 27 in the concentric cylindrical bore of a cylinder 28. Cylinder 28 is rotatable in bearings 29 and 30 in the cylindrical bore of casing 8. The eccentricity of the bore of cylinder 22, which is the distance between axis 31 of gimbal ring 20 and the rotational axis 32 of cylinder 22, is equal to the eccentricity of the bore of cylinder 25 which is the distance between axis 32 and axis 7.

Cylinder 22 is provided with a peripheral gear 33 meshing with a gear 34 mounted for rotation upon cylinder 25. A gear 35 identical with gear 34 is similarly mounted upon cylinder 25 so as to mesh with gear 34 and with an internal peripheral gear 36 with which cylindrical member 28 is provided. Cylinder 28 is provided with an external peripheral gear 37 which meshes with a gear 38 that is secured to a shaft 39. Cylinder 25 is provided with an external peripheral gear 40 which meshes with gear 41 secured to shaft 42. These shafts are rotatably mounted upon supporting member 5.

Gears 41 and 36 are chosen so that torque applied to gear 41 and transmitted through intermediate gears 35 and 34 causes cylinder 22 to rotate at an angular speed equal and opposite to that of cylinder 25 with respect to member 28. Consequently, when gear 38 is held stationary and gear 41 is rotated, projecting member 15 reciprocates or nods in a plane including axis 7 and axis 14. Orientation of the plane of reciprocation is accomplished by movement of handle 12 to turn casing 8 with respect to support 5.

When handle 12 is positioned so that the nodding plane is vertical, the high-speed, high amplitude nodding of radiating member 15 combined with the relatively low-speed azimuth rotation of head 1 results in sweeps of axis 43 defining successive, approximately vertical planes, thoroughly combing the volume being searched.

Handle 12 can be positioned to any other elevation angle as for instance on ships, when handle 12 is disposed horizontally the antenna is available as a navigation device affording rapid scanning of the surface of the water during conditions of poor visibility.

Circular scanning is accomplished by rotating cylinder 25 by rotation of shaft 42 and cylindrical member 28 by rotation of shaft 39 in the same direction at equal angular speeds. Since under this condition there is no relative motion between cylinders 22 and 25, radiating element 15 is caused to nutate in a circle about axis 7. Two positions of member 15 during this rotation are shown in Figs. 4 and 5. The diameter of the circle depends upon the relative positions of cylinders 22 and 25.

Spiral scanning is accomplished by rotating cylinders 22 and 25 in the same direction at different speeds to produce a spiral trace of a scanning axis 43 of the projected beam, as shown in Fig. 6. The lead characteristic of the spiral trace is changed by varying the differential between the two speeds.

The weight of the cylindrical members 22 and 25 is distributed so as to balance radiating member 15 and to compensate for the eccentric cylindrical bores of members 22 and 25 in order to balance the nutation mechanism statically and dynamically.

While we have shown a particular embodiment of our invention, it will, of course, be understood that we do not wish to be limited thereto since different modifications both in the arrangement and in the instrumentalities employed may be made, and we contemplate by the appended claims to cover any such modifications as fall within the true spirit and scope of our invention.

What we claim as new and desire to secure by Letters Patent of the United States is:

1. In combination, a supporting member having a cylindrical bore, a first gimbal centered on the axis of said bore, an elongated member centered at one end in said gimbal and means for circularly nutating said elongated member about said axis comprising a cylinder rotatable in said bore about said bore axis and having a cylindrical bore eccentric with the longitudinal axis of said cylinder, a second gimbal centered in said eccentric bore, means for slidably mounting said elongated member intermediately thereof in said second gimbal, and means for rotating said cylinder about its longitudinal axis so that said elongated member is thereby circularly nutated about said axis 2. In combination a supporting member having a cylindrical bore, a first gimbal centered on the axis of said bore, an elongated member centered at one end in said gimbal and means for nutating said elongated member with respect to said bore axis comprising a first cylinder rotatable in said bore and having a first cylindrical bore eccentric with respect to the longitudinal axis of said first cylinder, a second cylinder rotatably mounted in said first eccentric bore and having a second cylindrical bore eccentric with respect to the longitudinal axis of said second cylinder, a second gimbal centered in said second eccentric bore, means for slidably mounting said elongated member intermediately thereof in said second gimbal and means for rotating said cylinders about their respective longitudinal axes at selected angular speeds relative to said supporting member to vary the nutation pattern of said elongated member.

3. A device for controlling the circular nutation of the radiating member of a radar antenna including a support, a reflector mounted thereon, said reflector having a reflector axis and having a center cutaway section, a casing rotatably mounted upon said support, said casing having a concentric cylindrical bore centered on said reflector axis, a first gimbal mounted in said concentric bore and centered on said reflector axis, said radiating member being pivoted at one end in said gimbal and projecting through said cutaway section, a cylinder rotatable within said cylindrical bore about an axis parallel to said reflector axis and provided with a cylindrical bore eccentric to the longitudinal axis of said cylinder, a second gimbal centered in said eccentric bore, means for slidably mounting said radiating member intermediately thereof in said second gimbal and means for rotating said cylinder so that said radiating member is nutated in a circle about said reflector axis.

4. A device for controlling the vertical nutation of a radiating antenna including a supporting casing, a reflector mounted thereon, said reflector having a reflector axis and provided with a center cutaway section, said casing being provided with a cylindrical bore and an internal peripheral gear centered in said reflector axis, a first gimbal mounted in the bore of said casing and centered in said reflector axis, the support axis of said gimbal forming a nutation axis, a radiating member pivoted at one end in said gimbal and projecting through said cutaway section, a first cylinder rotatable within the cylindrical bore of said casing, said first cylinder having a first cylindrical bore eccentric to the longitudinal axis thereof and provided with a first external peripheral gear, a second cylinder rotatable in said first eccentric bore and having a second cylindrical bore eccentric to the longitudinal axis thereof, the eccentricities of said first and second cylinders being equal, said second cylinder being provided with a second external gear therearound, a second gimbal centered in said second eccentric bore, means for slidably centering said radiating member intermediately thereof in said second gimbal, a pair of meshing gears mounted for rotation upon said first cylinder respectively meshing with said internal and said second external peripheral gear and means meshing with said first external gear for rotating said first cylinder so that said radiating member nutates in a vertical plane including said reflector axis.

5. A device for controlling the linear nutation of a radiating antenna including a support, a reflector mounted thereon, said reflector having a reflector axis and provided with a center cutaway section, a casing rotatably mounted upon said support, said casing having a cylindrical bore centered in said reflector axis and provided with an internal peripheral gear centered in said reflector axis, a first gimbal mounted in the bore of said casing and centered on said reflector axis, a radiating member pivoted at one end in said gimbal and projecting through said cutaway section, a first cylinder rotatable within said cylindrical bore, said first cylinder having a first cylindrical bore eccentric with the longitudinal axis thereof and being provided with a first external peripheral gear, a second cylinder rotatable in said first eccentric bore and having a second cylindrical bore eccentric with the longitudinal axis thereof, the eccentricities of said first and second cylindrical bores being equal, said second cylinder being provided with a second external peripheral gear therearound, a second gimbal centered in said second eccentric bore, means for slidably mounting said radiating member intermediately thereof in said second gimbal, a pair of meshing spur gears mounted for rotation upon said first cylinder and respectively meshing with said internal peripheral gear and said second external peripheral gear, means for rotating said first cylinder meshing with said first peripheral gear so that said first and second cylinders rotate with equal angular speeds and in opposite directions with respect to said casing to cause said radiating member to nutate in a line and means for rotating said casing with respect to said support to orient the plane of said line.

6. An antenna scanner comprising a head rotatable about a vertical axis, a support pivotable upon said head, a reflector having a reflector axis mounted upon said support, said reflector having a cutout center section, a casing projecting through said support and rotatable about said reflector axis, said casing having a cylindrical bore, a first gimbal centered within said bore on said reflector axis, a radiating member for projecting and receiving electromagnetic waves pivoted at one end in said first gimbal and projecting through said reflector, a device for nutating said radiating member with respect to said reflector axis, including a cylindrical member rotatable within said casing and having a concentric cylindrical bore said cylindrical member being provided with internal and external peripheral gears centered in the longitudinal axis thereof, a first cylinder rotatable within the bore of said cylindrical member and having a first cylindrical bore eccentric to the longitudinal axis thereof, said first cylinder being provided with a concentric external peripheral gear, a second cylinder rotatable within said first eccentric bore and having a second cylindrical bore eccentric with the longitudinal axis thereof, said second cylinder being provided with an external concentric peripheral gear, a second gimbal centrally mounted in said second eccentric bore, means for slidably mounting said radiating member intermediately thereof in said second gimbal, the eccentricities of said cylinders being equal, a pair of meshing gears mounted for rotation upon said first cylinder and meshing with the peripheral gear of said second cylinder and said internal peripheral gear, means for rotating said first cylinder including a spur gear mounted for rotation upon said support and meshing with the peripheral gear of said first cylinder, and means for rotating said cylindrical member including a spur gear mounted for rotation upon said support and meshing with the external peripheral gear of said cylindrical member, said rotating means being operable at varying relative speeds so as to vary the angular speeds of said cylinders with respect to said support to vary the pattern of nutation of said radiating member.

7. In combination a support provided with a cylindrical bore a cylindrical member rotatably mounted within said support and having a concentric cylindrical bore an elongated member universally pivoted upon said support and extending through said sleeve bore, said elongated member having an axis including a fixed point on the axis of said cylindrical member bore to oscillate with respect to said support about said fixed point, means enclosed in said cylindrical member bore and enclosing said elongated member for nutating said elongated member axis with respect to said cylindrical member axis including intermediate cylindrical means rotatable within said support bore about said cylindrical member axis and having an eccentric cylindrical bore therein, inner means rotatable within the bore of said intermediate means about said intermediate bore axis and provided with an eccentric bore, a gimbal centered in said inner means bore, said elongated member being intermediately slidably centered in said gimbal, the maximum spacing of said intermediate bore axis from said support axis and from said inner bore axis being equal and means for variably rotating said cylindrical member and said intermediate means to produce various nutation patterns of said elongated member with respect to said support.

WAYNE R. CHILDS.
FRANK A. SCHNELL.
RICHARD J. NEWMAN.

REFERENCES CITED

The following references are of record in the file of this patent:

UNITED STATES PATENTS

| Number | Name | Date |
|---|---|---|
| 2,256,134 | Bornay | Sept. 16, 1941 |
| 2,407,310 | Lundy | Sept. 10, 1946 |
| 2,410,831 | Maybarduk | Nov. 12, 1946 |
| 2,457,562 | Karleen | Dec. 28, 1948 |